United States Patent [19]
Endo et al.

[11] Patent Number: 5,665,422
[45] Date of Patent: Sep. 9, 1997

[54] PROCESS FOR FORMATION OF AN ULTRA FINE PARTICLE FILM

[75] Inventors: Yoshishige Endo, Tsuchiura; Masahiko Ono, Ibaraki-ken; Hiromitsu Kawamura; Katsumi Kobara, both of Mobara, all of Japan

[73] Assignee: Hitachi, Ltd., Tokyo, Japan

[21] Appl. No.: 413,447

[22] Filed: Mar. 30, 1995

Related U.S. Application Data

[63] Continuation-in-part of Ser. No. 62,747, May 18, 1993, abandoned, which is a continuation-in-part of Ser. No. 855,055, Mar. 19, 1992, abandoned.

[30] Foreign Application Priority Data

| Mar. 19, 1991 | [JP] | Japan | 3-054371 |
| May 18, 1992 | [JP] | Japan | 4-124502 |
| Mar. 31, 1994 | [JP] | Japan | 6-062274 |

[51] Int. Cl.$^6$ ................................. B05D 5/12
[52] U.S. Cl. .................. 427/71; 427/163.1; 427/165; 427/202; 427/203; 427/204; 427/205; 428/212
[58] Field of Search ............... 427/202, 203, 427/204, 205, 71, 163.1, 165; 428/212

[56] References Cited

U.S. PATENT DOCUMENTS

| 4,765,729 | 8/1988 | Taniguchi | 428/336 X |
| 5,168,097 | 12/1992 | Araya et al. | 427/62 X |
| 5,189,237 | 2/1993 | Endo et al. | 313/479 |
| 5,396,148 | 3/1995 | Endo et al. | 313/499 |

OTHER PUBLICATIONS

Physics of Thin Film, vol. 2 (1964), pp. 242–284.

Applied Physics Letter No. 36 (1980), pp. 727–730.

*Primary Examiner*—Michael Lusignan
*Attorney, Agent, or Firm*—Antonelli, Terry, Stout & Kraus, LLP

[57] ABSTRACT

The present invention relates to an ultrafine particle film which is effective for the prevention of electrostatic charge and reflection of visible light and can be applied to a large area, and a process for producing an image display plate to which the ultrafine particle film is applied.

This process comprises attaching an object to be coated to a coating solution bath, filling the coating solution bath with a coating solution containing ultrafine particles with a high refractive index, and then exposing the object to be coated, to form an electrically conductive film, the above procedure being repeated by the use of a coating solution containing ultrafine particles with a low refractive index to form a visible light anti-reflection film.

12 Claims, 9 Drawing Sheets

BLOCK DIAGRAM OF A FILM FORMING PROCESS

BLOCK DIAGRAM OF A FILM FORMING PROCESS

LAYOUT DRAWING OF A DEVICE

FIG.3
SECTIONAL PERSPECTIVE VIEW OF ULTRAFINE PARTICLE FILM
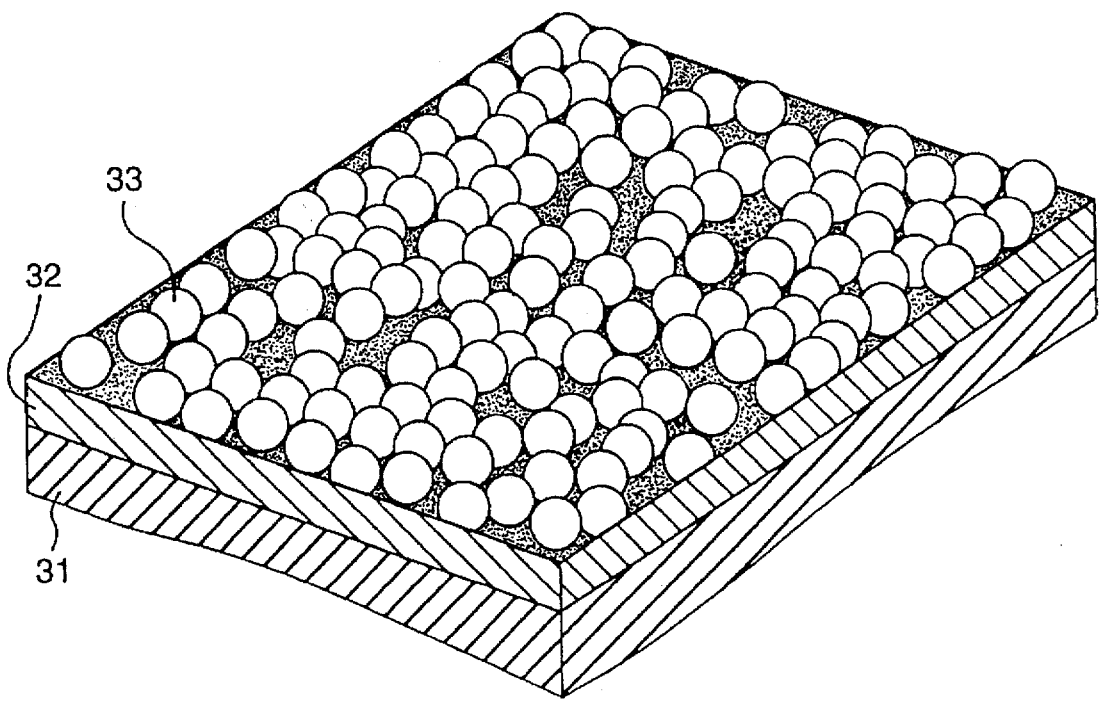
FIG.4  GRAPH SHOWING REFLECTION CHARACTERISTICS
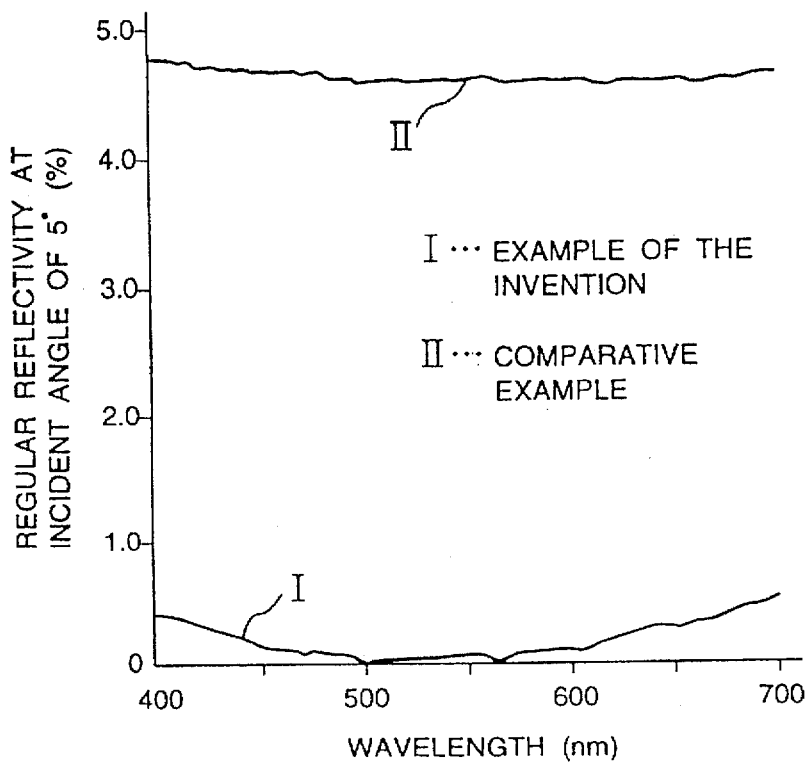
I ⋯ EXAMPLE OF THE INVENTION
II ⋯ COMPARATIVE EXAMPLE

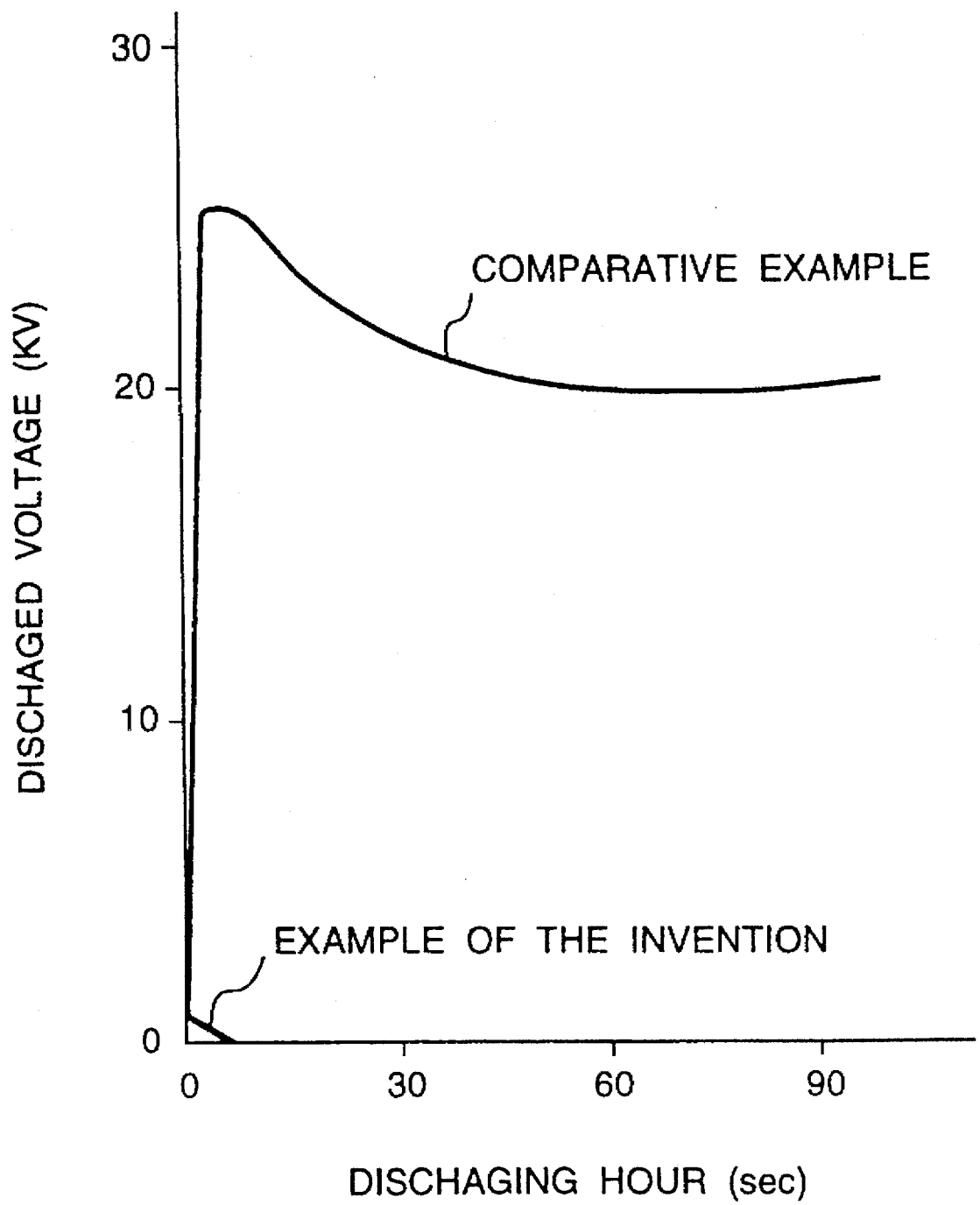

LAYOUT DRAWING OF A DEVICE

SCHEMATIC CROSS-SECTIONAL VIEW OF
ULTRAFINE PARTICLE FILM

ONE EMBODIMENT TO WHICH THE
INVENTION HAS BEEN APPLIED

CROSS-SECTIONAL VIEW OF A BRAUN TUBE

DIAGRAMMATIC ILLUSTRATION OF ANTI-REFLECTION PRINCIPLE

REFRACTIVE INDEX OF AIR $n_o = 1.00$

REFRACTIVE INDEX OF GLASS $n_g = 1.53$

REFRACTIVE INDEX $Nf(x) = n_g \cdot V(x) + n_o (1-V(x))$

SCHEMATIC ILLUSTRATION OF ANTI-REFLECTION PRINCIPLE

GRAPH SHOWING REFLECTION CHARACTERISTICS

ILLUSTRATION OF A REFLECTION CHARACTERISTICS MODEL

ILLUSTRATION OF ANOTHER REFLECTION CHARACTERISTICS MODEL

PROCESS FOR FORMATION OF AN ULTRA FINE PARTICLE FILM

CROSS REFERENCE TO RELATED APPLICATIONS

This is a continuation-in-part of U.S. application Ser. No. 08/062,747, filed May 18, 1993, now abandoned which is a CIP of U.S. application Ser. No. 07/855,055, filed Mar. 19, 1992, now abandoned.

BACKGROUND OF THE INVENTION

1. Field of the Invention

The present invention relates to a process for forming an ultrafine particle film, especially an ultrafine particle film having both anti-reflection and antistatic functions, a light-transmitting plate and an image display plate formed by applying this technique, and a process for the production thereof.

2. Related Art

Films to reduce the reflectivity (anti-reflection films) capable of reflecting the visible light on a transparent plate surface have been long studied, and have been applied to lenses for cameras and ophthalmic glasses. At present, such films are used as an anti-reflection filter for reducing the reflected light on VDTs (visual display terminal). A variety of anti-reflection films have been proposed, and those mainly used now are multi-layered films and heterogeneous films.

A multi-layered film has a structure in which a material having a low refractive index and a material having a high refractive index are alternately stacked to form at least three layers. Its anti-reflection effect is a synergistic effect produced by the optical interference function of each layer. Multi-layered films are discussed in Physics of Thin Films, 2 (1964), pp. 242–284.

A heterogeneous film having a refractive index distribution in the film thickness direction is generally formed by rendering a transparent plate surface porous.

Apl. Phys. Lett., 36 (1980), pp. 727–730 discusses a method of reducing the reflectivity in which a heterogeneous film is produced by forming an insular metal deposition film on a glass surface and forming a fine uneven surface by sputter etching.

On the other hand, in a cathod ray tube, there are required not only formation of an electrically conductive film for preventing electrostatic charge on glass surface but also use of devices for preventing reflection.

Meanwhile, it is known that the front panel surface (image display plate) of a cathode ray tube such as a Braun tube is electrostatically charged. The reason therefor is as follows. Aluminum is generally deposited to form a thin and uniform film 84 on a phosphor 83 applied to an inner surface 82 of a Braun tube 81 as shown in FIG. 8. In the application of a high voltage to the aluminum film 84, an electrostatic charge occurs on a front panel 85 of the Braun tube owing to electrostatic induction when the high voltage is applied and cut off.

For example, JP-A-61-51101 discloses a method for preventing both electrostatic charge and reflection on such a display tube surface. In this method, first an electrically conductive film is formed on a glass substrate by a physical vapor phase method or a chemical vapor phase method, such as vacuum deposition, sputtering, etc., and then anti-reflection film is formed thereon.

The above prior arts entail high cost because of necessity for high-precision control of the film thickness, and moreover the film-forming method used in them is limited to a sputtering or vacuum deposition method. Thus, application of these prior art methods to a substrate having a large surface area is substantially impossible owing to the restrictions on the apparatus which are inevitable in these methods.

The anti-reflection films formed by the above methods are basically of a structure in which the materials differing in refractive index are deposited in layers on a glass surface, and reflection is prevented by an optical interference function of each layer. For facilitating understanding of the anti-reflection mechanism, a most simple single-layer deposited film is considered here. When a glass surface having a refractive index of Ng is coated with a material having a lower refractive index than glass, Nf, to a thickness of d, the reflecting behavior of the light incident on this surface can be determined from the Fresnel's formulas, and the reflectivity R is given by the equation 1:

Equation 1

$$R = \frac{(Nf^2 - Ng)^2}{(Nf^2 + Ng)^2}$$

Here, it is assumed that there exists the relation of the equation 2:

Equation 2

$$Nf \times d = \frac{\lambda}{4}$$

wherein d is layer thickness, and $\lambda$ is light wavelength.

From the above equation, R=0 when Nf=$\sqrt{Ng}$. This signifies a state where there is no reflection of light with a wavelength of $\lambda$. Since Ng is 1.52 for the most common soda glass, coating of the glass with a material with Nf=1.23 gives an ideal anti-reflection film at a wavelength $\lambda$ which is decided according to the film thickenss d. However, there is not yet any available material having such a low refractive index, and among the materials usable at present, magnesium fluoride ($MgF_2$) with Nf=1.38 is the material having the lowest refractive index. In this case, the reflectivity R=1.3%. As apparent from the equations 1 and 2, anti-reflection conditions for a single-layer film are set for a specific wavelength $\lambda$, and the reflectivity increases around this specific wavelength $\lambda$. Therefore, in order to reduce the reflectivity in the whole region of visible light (400–700 nm), it has been necessary to laminate the materials with different refractive indices to form a multi-layer structure while strictly controlling the film thickness. Surface reflection can be reduced also by using a heterogeneous film having a refractive index distribution in the film thickness direction. In case the glass surface has such an unevenness as is illustrated in FIG. 10, the refractive index (nF(x)) can be represented by the equation 3 when the coordinate in the layer depth direction is expressed by x:

Equation 3

$$nF(x) = ng \times V(x) + (1 - V(x)) \times n_0$$

wherein ng is the refractive index of glass, V(x) is the volume occupied by glass at x, and no is the refractive index of air.

In this case, the refractive index varies discontinuously at the interface between air and film and at the interface between film and glass substrate as shown in FIG. 11. Therefore, when the refractive indices at these points are taken as $n_1$ and $n_2$, respectively, the reflectivity R of this layer is represented by the equation 4:

Equation 4

$$R = 1 - \frac{4n_0 n_1 n_2 n_g}{(n_1 n_g + n_0 n_2)^2 - (n_1^2 - n_0^2)(n_g^2 - n_2^2)\sin^2 \delta a/2}$$

wherein $\delta a = \frac{2\pi}{\lambda}(n_1 + n_2) \cdot da$

The reflectivities determined from the above equation at $n_0=1.0$ (refractive index of air), $n_1=1.1$, $n_2=1.47$ and $n_g=1.53$ (refractive index of glass) with visible light wavelengths are graphically shown in FIG. 12. It will become clear from this graph that the lowest reflectivity can be obtained when the surface roughness is around 100 nm (0.1 μm). It is, however, difficult to provide an unevenness of such a size regularly on a glass surface, and much time is required for forming such an unevenness even by etching. The present inventors have previously proposed a film having low reflection characteristics comparable with a three-layer deposited film by forming said unevenness with ultrafine particles. In case an uneven film is formed with ultrafine particles, the reflection characteristics are basically represented by the equation 4, but since a thin binder layer 2 is formed between the ultrafine particles 4 and the surface of the substrate 3 as shown in FIG. 13, it is necessary to distinguish between the thin layer 2 and the ultrafine particle layer 4. The ultrafine particle surface layer can be diagrammatically represented by a model shown in FIG. 14. In this case, when ng (refractive index of glass, 1.53) in the equation 4 is replaced by ns (double refractive index of binder and ultrafine particles, 1.47), the following equation 5 is given:

Equation 5

$$Ra = 1 - \frac{4n_0 n_1 n_2 n_s}{(n_1 n_s + n_0 n_2)^2 - (n_1^2 - n_0^2)(n_s^2 - n_2^2)\sin^2 \delta a/2}$$

wherein $\delta a = \frac{2\pi}{\lambda}(n_1 + n_2) \cdot da$

Assuming $n_0=1.0$, $n_1=1.10$, $n_2=1.38$ and $n_s=1.47$, Ra is about 0.19% at $\lambda=550$ nm.

SUMMARY OF THE INVENTION

The present inventors had found that when the level of a mixed coating solution containing a predetermined amount of ultrafine particles is elevated or lowered on the substrate surface at a constant rate, the ultrafine particles contained in the coating solution are regularly arranged and applied on the substrate surface to give a low reflectivity close to a theoretical value, and this finding was filed for a patent as U.S. Ser. Nos. 08/062,747 and 07/855,055 the contents of which are incorporated herein for reference. As a result of a further study, it has been found that by applying on a substrate a coating solution containing ultrafine particles with a high refractive index but not a binder to form a first layer at first, and then further applying thereon a mixed coating solution of ultrafine particles with a low refractive index and a binder to form a second layer, not only stabilized characteristics but also greatly improved reflection characteristics can be attained regardless of the substrate material.

An object of the present invention is to provide a process for forming a visible light anti-reflection film, an antistatic film and/or an infrared-reflection film which can be produced at low cost and can be applied to a large surface area, and a light-transmitting plate, image display plate, image display protection plate, Braun tube, liquid crystal panel, window glass for automobiles, protective plate for exhibited articles, etc., which have on their surfaces a film formed according to said process.

The above object can be achieved by covering at first a substrate surface with a coating solution containing ultrafine particles with a high refractive index dispersed therein and no binder, exposing the substrate surface to adhere the ultrafine particles with a high refractive index in the form of a layer, and then carrying out the same treatment as above except for using a mixed coating solution of a binder and ultrafine particles with a low refractive index in place of the aforesaid coating solution, to form a layer of the ultrafine particles with a low refractive index on the layer of the ultrafine particles with a high refractive index.

BRIEF DESCRIPTION OF THE DRAWINGS

FIG. 3 is a sectional perspective view of one embodiment of the ultrafine particle film of the present invention.

FIG. 4 shows reflection characteristics of an anti-reflection film to which an ultrafine particle film of the present invention has been applied.

FIG. 5 shows antistatic characteristics of an antistatic film to which an ultrafine particle film of the present invention has been applied.

DETAILED DESCRIPTION OF PREFERRED EMBODIMENTS

Figure 1:
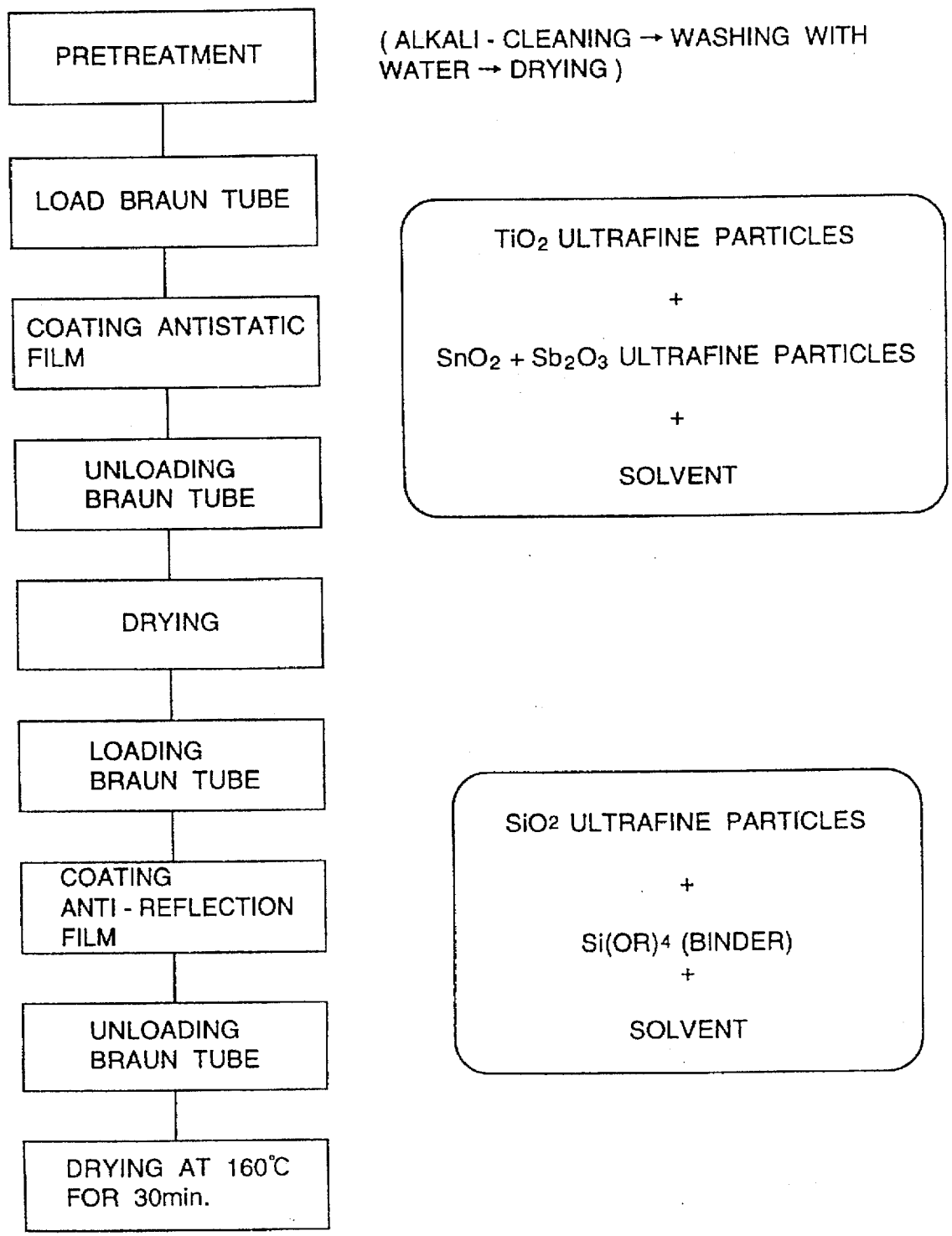
FIG. 1 is a block diagram of a film forming process in an embodiment of the present invention.

Specifically, the process for forming an ultrafine particle film of the present invention is essentially a process in which an ultrafine particle film is formed on a substrate surface by ultrafine particles and a binder filled in gaps between the ultrafine particles. More specifically, a substrate on which an ultrafine particle film is to be formed is placed in a container, and for forming a first layer at first, a coating solution of ultrafine particles with a refractive index higher than that of the substrate is introduced into the container. After the portion of the substrate where an ultrafine particle film is to be formed has been covered with the coating solution, the coating solution is discharged out of the container to expose said portion of the substrate to open air. Then, for forming a second layer, the above procedure is repeated by the use of a mixed coating solution of ultrafine particles with a refractive index lower than that of the substrate and a binder, whereby two or more layers of ultrafine particle film are formed on the substrate surface.

The process of the present invention is characterized by placing the aforesaid substrate in a container for coating solution; introducing a coating solution of ultrafine particles with a refractive index higher than that of the substrate into the container; discharging the coating solution out of the container after the coating solution has overspread the portion of the substrate where ultrafine particle film is to be formed, to form a first layer; then introducing a mixed coating solution of ultrafine particles with a refractive index lower than that of the substrate and a binder into the container; discharging the mixed coating solution out of the container after the mixed coating solution has overspread the portion of the substrate where ultrafine particle film is to be formed, to form a second layer; and thereby forming an ultrafine particle film composed of the two layers on the surface of the substrate.

In one aspect of the present invention, the object of the invention can be achieved by an ultrafine particle film composed of at least two layers formed on a substrate having light-transmitting properties, wherein a first layer near the substrate is formed so that the ultrafine particle density may be high on the substrate side and low on the side reverse to the substrate, and a second layer on the first layer is formed using ultrafine particles with a diameter larger than that of the ultrafine particles which constitute the first layer.

In addition, the object can be achieved by forming the aforesaid second layer as a surface layer composed of a single-layer film.

It is sufficient that one or more layers on the second layer are formed using ultrafine particles having a refractive index less than that of the second layer.

Another process for forming an ultrafine particle film according to the present invention is a process in which an ultrafine particle film composed of at least two layers is formed on a substrate by ultrafine particles and a binder filled in gaps between the ultrafine particles, said process being characterized in that at least two of the layers which constitute the ultrafine particle film are formed as follows: a first layer is formed so that the ultrafine particle density may be high on the substrate side and low on the side reverse to the substrate, and then a second layer on the first layer is formed using ultrafine particles with a diameter larger than that of the ultrafine particles which constitute the first layer.

This process is characterized also in that the ultrafine particle film is formed on the substrate by forming the first layer by application of a coating solution of ultrafine particles with a refractive index higher than that of the substrate, and then forming the second layer by application of a mixed coating solution of ultrafine particles with a refractive index lower than that of the substrate and the binder.

Figure 2:
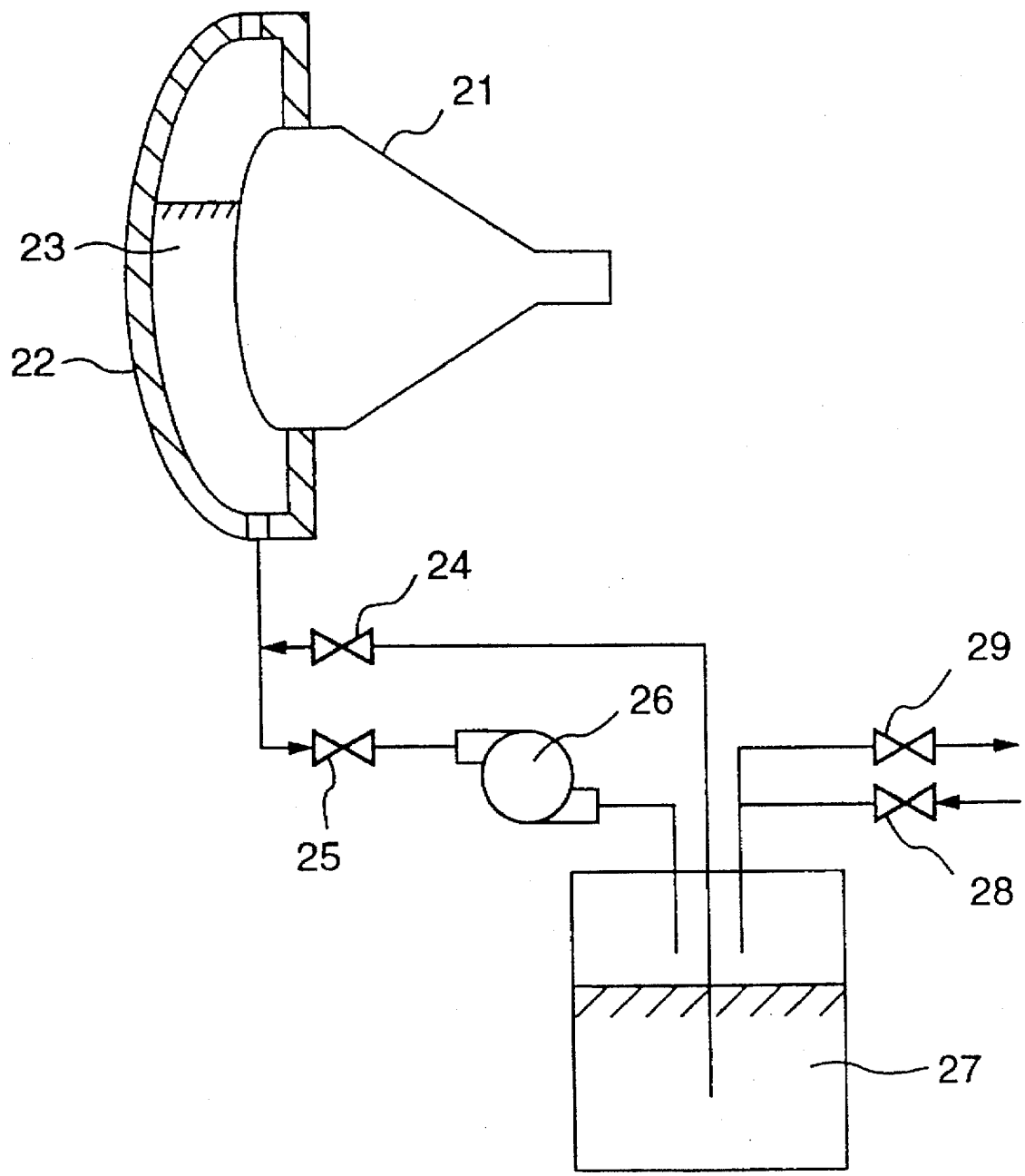
FIG. 2 is a layout drawing of a device in one embodiment of the present invention.

In said process, as schematically shown in FIG. 2, an opening of the size corresponding to the portion to be coated of the substrate may be provided in a side of a container in which the substrate is to be placed, and the substrate may be placed in the opening.

The rate of exposing the said portion of the substrate after coating is preferably 10 mm/s or less.

The phrase "the ultrafine particle density is high" used herein means that the number of fine particles per a defined unit area is large such that more than 90% of the surface area is covered by the fine particles. The phrase "the ultrafine particle density is low" used herein means that the number of fine particles per a defined unit area is small such that less than 70% of the surface area is covered by the fine particles.

The material for the ultrafine particles with a low refractive index used in the second layer is selected from the group consisting of $SiO_2$ (silicon dioxide) and $MgF_2$ (magnesium fluoride). The material for the ultrafine particles with a high refractive index used in the first layer is selected from the group consisting of $SnO_2$ (tin dioxide), $SnO_2+Sb_2O_3$ (antimony oxide), $In_2O_3$ (indium oxide) and $In_2O_3+SnO_2$. The material for the infrared-reflection ultrafine particles is selected from the group consisting of $SnO_2$, $SnO_2+Sb_2O_3$, $In_2O_3$, $In_2O_3+SnO_2$, $TiO_2$ (titanium oxide) and $ZrO_2$ (zirconium oxide).

In case the substrate is glass, $Si(OR)_4$ (wherein R is alkyl) is used as binder. In this case, the substrate is pretreated with an alkali or an acid. In case the substrate is a plastic, $Si(OR)_4$ (wherein R is alkyl) is used as binder while using a coupling agent having a functional group pertinent to the plastic. Also in this case, the substrate is preferably pretreated with an alkali or an acid.

As to the coupling agent, γ-methacryloxypropyltrimethoxysilane is recommended when the plastic is an acrylic resin, and γ-glycidoxypropyltrimethoxysilane is preferred when the plastic is an epoxy resin.

An ultrafine particle film may be formed either on each side or on only one side of the substrate.

The ultrafine particles with a low refractive index are preferably $SiO_2$ ultrafine particles having an average particle size (hereinafter simply referred to as particle size) of 40 to 200 nm, and the ultrafine particles with a high refractive index are preferably those which are composed of a tin oxide compound and a titanium oxide compound and have a particle size of 10 nm or less.

The substrate on which an ultrafine particle film is formed according to the above process is a light-transmitting plate, and this light-transmitting plate can be used as a liquid crystal panel, window glass for automobiles, a protective plate for exhibits such as pictures and the like.

An ultrafine particle film may be formed on a light-transmitting substrate by the above process, and such a film-coated light-transmitting substrate may be used as an image display plate or an image display protection plate. Further, such an image display plate or image display protection plate may be applied to a Braun tube.

The above-mentioned substrate need not be flat and may be one which has a curved shape, such as a front window of automobile, lens, etc.

The action of the present invention by the constitution described above is explained below.

It is generally known that when a film is formed from a coating solution containing no ultrafine particles by a dipping method, the following equation 6 holds between film thickness t and withdrawl rate v:

Equation 6

$$t = K(\eta v/pg)^{0.5}$$

wherein η is the viscosity of a solution, p is the density of the solution, g is gravitational acceleration, and K is a constant.

On the other hand, the present inventors have found that when the level of a mixed coating solution containing relatively large anti-reflection ultrafine particles (40–200 nm) is elevated or lowered on the substrate surface at a constant rate, the arrangement of the ultrafine particles varies greatly depending on the substrate material or the surface condition of the substrate. For instance, when the ultrafine particles are coated on commercial plate glass, the arrangement of the ultrafine particles on the front side and that on the rear side are different from each other, so that the front and rear sides are different in reflection characteristics. Analyses of the surface condition of such plate glass by a surface analyzer such as X-ray photoelectric spectrophotometer (XPS) detected a greater amount of $SnO_2$ (tin oxide) from the surface on one side. This is considered attributable to adhesion of tin to glass when the molten glass passes over the tin bath in the plate glass producing process. $SnO_2$ which has adhered to glass is difficult to remove even if the glass is subjected to a pretreatment (glass cleaning). It has been found that when a mixed solution containing the ultrafine particles is coated on a substrate of such a surface condition, its wettability is different from that attained when the substrate is in the ordinary surface condition, so that the mixed solution can be thinly applied. This means that as appreciated from the equation 7, it is possible to increase the coating rate for obtaining a same film thickness. Especially when the substrate to be coated is of a large surface area, an increase of coating rate naturally leads to a reduction of coating time and hence a reduction of manufacturing cost.

As explained above, difference in substrate material causes difference in surface condition, and this results in a change of wettability and a corresponding variation in thickness of the ultrafine particle film. Therefore, in order to obtain a same film thickness and a same arrangement of ultrafine particles, the coating conditions should be changed for each substrate. In particular, glass and plastic are completely different in surface condition, and hence it is necessary to give careful considerations on setting of the coating conditions including the pretreatment.

According to the process of the present invention, since there are previously applied the small ultrafine particles (10 nm or less) of an oxide such as $SnO_2$, $In_2O_3$ (indium oxide) or titanium oxide which have a high refractive index, it is possible to provide a uniform surface condition in the second and succeeding runs of coating even if the substrates to be treated are different in surface condition or composing material. It is thus possible to obtain the same film characteristics under the similar coating conditions. In case of using a mixed coating solution containing the small ultrafine particles of 10 nm as the said ultrafine particles with a high refractive index, although the arrangement of the particles varies according to the difference in surface condition of the substrate, the particles need not be arranged regularly as in the case of an anti-reflection ultrafine particle film, so that the ultrafine particle film having the substantially constant characteristics can be obtained without influence of the kind of the substrate by applying a same pretreatment and using the same coating conditions.

When a layer of ultrafine particles with a high refractive index containing no binder is first formed as a first layer, a porous film is consequently formed because of the absence of a binder. In this case, the porosity increases with a decrease of the distance from the film surface owing to difference in drying rate, evaporation of a solvent from the inside of the film, etc. When a mixed coating solution containing ultrafine particles with a low refractive index and a binder is applied on the first layer to form a second layer, a part of the binder goes into the porous portion and spaces among the ultrafine particles in the first layer to form a mixed layer. Therefore, when the refractive index of the binder is lower than that of these ultrafine particles, the film composed of the first layer decreases in refractive index gradually between the substrate and the boundary surface of the second layer with a decrease of the distance from the boundary surface. In other words, the refractive index has a continuous gradient. In the second layer, relatively large ultrafine particles are arranged in a layer by employment of proper coating conditions and a part of the binder is formed in the lower part of the second layer to bond the ultrafine particles to the first layer. Accordingly, a continuous refractive index variation due to the shape of the ultrafine particles takes place in the upper part of the second layer. By virtue of the above-mentioned continuous refractive index variations in the first layer and the second layers, it becomes possible to attain very excellent anti-reflection characteristics.

Embodiments of the present invention are explained below with reference to the drawings. First, the constituent requirements of the present invention are individually explained below.

Ultrafine Particles

The ultrafine particles are not specifically limited in function as far as the transparency and the light-transmitting properties (this term hereinafter includes transparency) are not hindered, but refer to those having a submicron average particle diameter. Typical functions thereof are antistatic, anti-reflection and/or infrared-reflection.

The material for the anti-reflection ultrafine particles is preferably selected from the group consisting of $SiO_2$ (silicon dioxide) and $MgF_2$ which have a low refractive index. The material for the antistatic ultrafine particles is preferably selected from the group consisting of $SnO_2$, $SnO_2+Sb_2O_3$ (antimony oxide), $In_2O_3$ and $In_2O_3+SnO_2$, which have a high refractive index. The material for the infrared-reflection ultrafine particles is preferably selected from the group consisting of $In_2O_3$, $In_2O_3+SnO_2$, $TiO_2$ (titanium oxide) and $ZrO_2$ (zirconium oxide).

The above ultrafine particles with a low refractive index preferably have an average particle size of 40 to 200 nm. When this average particle size is less than 40 nm, the obtained film may have too flat an outermost surface, so that no sufficient anti-reflection effect can be obtained. When it is more than 200 nm, a sufficient anti-reflection effect can be obtained, but diffuse reflection increases, so that opacification of the film and a decrease of the resolution tend to be caused. Therefore, the particle size of the ultrafine particles with a low refractive index is preferably 40 to 200 nm. Accordingly, the depth of hollows formed between the ultrafine particles is preferably 20 to 100 nm. All the materials, $SiO_2$, $MgF_2$, etc., for the anti-reflection ultrafine particles have a refractive index of not more than 1.50 which is lower than the refractive index of glass or plastic substrates usually used in display devices.

The ultrafine particles with a high refractive index preferably have an average particle size of not more than 10 nm. In this case, the ultrafine particles different in kind may be used in combination. When the ultrafine particles having an average particle size of not more than 10 nm are contained in the coating solution, there can be obtained the relatively uniform films even if the substrate varies in surface condition. In addition, even if the coating solution is applied thickly, the possibility of causing a reduction of transmittance or clouding of the film is relatively small.

As the ultrafine particles having a high refractive index and a light-transmitting and electrically conductive function, an infrared-reflection function or an electromagnetic wave shielding function, there can be exemplified metal oxides such as $SnO_2$, $In_2O_3$, $TiO_2$ and $ZrO_2$ and mixtures thereof. Preferable is $SnO_2$+10 wt % $Sb_2O_3$ or $In_2O_3$+5 wt % $SnO_2$ because such a mixture is excellent in electrically conductive properties and infrared reflection characteristics. The film thickness of coating film of the mixture is preferably 0.1 to 0.5 µm, and the average particle size is preferably 5 to 50 nm. The metal oxides having light-transmitting and electrically conductive properties or mixtures thereof show high light transmitting properties in the visible light region owing to their large energy band gap of 3 eV or above. They also show high electrical conductivity because they have a high free electron density owing to the deviation in these metal oxides or mixtures thereof from their stoichiometrical composition and the addition of impurities. $TiO_2$ ultrafine particles have a high refractive index and are excellent in light-transmitting properties in the visible light region. But they are poor in electrical conductivity, and hence use of them in admixture with $SnO_2$ ultrafine particles or the like makes it possible to obtain a film having both high electrical conductivity and high refractive index.

Light-transmitting Substrate

The light-transmitting substrate may be a glass plate, a plastic plate or a plastic film. Examples of the main component of the plastic plate are polyethylene, polypropylene, urethane, acryl, phenol, epoxy, melamine, polyamide, polyimide, polycarbonate, butyl, epoxyphenol, vinyl chloride and polyester. The surface of the substrate on which an ultrafine particle film is to be formed may be of course flat, and moreover it may also be a curved surface like the a Braun tube or front window of an automobile. Further, an ultrafine particle film may be formed on one surface or both surfaces. The surface on which said film is formed may be freely chosen according to the purpose of use and other matters.

Pretreatment

When the wettability to a substrate is considered, it is preferable to pretreat the substrate with an alkali or an acid. In the case of a plastic substrate, its pretreatment with a neutral detergent is also effective.

Application Method

The exposing rate of a substrate after covering with a coating solution is preferably not more than 10 mm/s. This exposing rate may be kept constant or varied according to the shape of the object to be coated (substrate). The substrate may be rested in a container, or the substrate surface may be exposed through a hole provided in a side of the container. The latter is suitable for forming an ultrafine particle film on a nearly completed product such as a Braun tube.

Although firing in a furnace at 50° to 200° C. is a practical heat treatment of the surface coated with the Coating solution, this surface may be fired by ultraviolet light from a high-pressure mercury lamp or the like for a short time.

The above explanation is given with reference to an example of dipping technique, but if a method for application on a plastic substrate and the uniformity of film surface need not be considered, not only the above-mentioned dipping technique but also other dipping techniques, spin coating, spray coating, a combination of spin coating and spray coating, and combinations of any of the two and a dipping technique are also effective.

Coating Solution

For forming the ultrafine particle film of the present invention, there is used a coating solution prepared by adding a binder and optionally a coupling agent and other additives to a predetermined amount of ultrafine particles (U.S. Ser. No. 07/855,055 is referred to for further details on this matter).

When the light-transmitting plate is a glass product, $Si(OR)_4$ (wherein R is alkyl) is preferably used as a binder. When the light-transmitting plate is a plastic, $Si(OR)x$ (wherein x is 2 to 4, preferably 3) is preferably used as a binder. Further, when the light-transmitting plate is made of a plastic material, it is preferable to use a coupling agent having a functional group suitable for the plastic material.

When the light-transmitting plate is a glass product, the ultrafine particles are dispersed in a solution of $Si(OR)_4$ (wherein R is alkyl) in an alcohol. When the light-transmitting plate is a plastic, the ultrafine particles are dispersed in a solution of a silane coupling agent having a functional group easily reactive to this polymer of the plastic and $Si(OR)x$ (wherein x is 2 to 4, preferably 3) in an alcohol or in a solution of a mixture of the above $Si(OR)_4$ and a silane coupling agent in an alcohol.

The coating solution is applied on a light-transmitting plate and the resulting coated surface is heated (or fired) to form a film. By this heat treatment, the $Si(OR)_4$ or the silane coupling agent is decomposed into $SiO_2$, etc., to serve as an adhesive between the ultrafine particles and the substrate.

In general, the symbol R in the $Si(OR)_4$ preferably represents an alkyl group having 1 to 5 carbon atoms. On the other hand, the silane coupling agent should be properly chosen depending on polymer material for the light-transmitting plate.

For example, when the light-transmitting plate is composed mainly of a polyethylene, polypropylene, urethane, acryl or the like, a silane coupling agent such as vinyltriethoxysilane or γ-methacryloxypropyltrimethoxysilane is effective. When the light-transmitting plate is composed mainly of phenol, epoxy, melamine, polyamide, polyimide, polycarbonate or the like, a silane coupling agent such as γ-aminopropylethoxysilane or γ-glycidoxypropyltrimethoxysilane is effective. Further, when the light-transmitting plate is composed mainly of butyl, epoxy phenol, vinyl chloride, polyester or the like, a silane coupling agent such as β,3,4-epoxycyclohexylethyltrimethoxysilane or γ-glycidoxypropyltrimethoxysilane is effective.

As to the alcohol in which the $Si(OR)_4$ or the silane coupling agent is to be dissolved, since the viscosity of the resulting alcoholic solution increases with an increase in the number of carbon atoms of the above R, the alchol is properly chosen so as not to increase the viscosity too much in view of operability. As said alcohol, for example, alcohols having 1 to 5 carbon atoms are generally usable.

Further, to decompose the $Si(OR)_4$, water and a mineral acid as catalyst (e.g. nitric acid) may be added when coating solution is prepared.

The following is an embodiment of the present invention in which the invention was applied to the front panel (glass face plate) of a Braun tube.

FIG. 1 is a block diagram illustrating the process in this embodiment of the invention.

First, the following pretreatment is carried out: the surface of the Braun tube is alkali-cleaned and washed with pure water, and then nitrogen gas or the like is blown thereto so that no marks of water drops will be left on the surface. Then, the Braun tube is attached to a coating device and a coating solution containing electrically conductive ultrafine particles ($SnO_2$) and ultrafine particles with a high refractive index ($TiO_2$) is applied thereon. The coating device and the coating method are hereinafter described. Typical examples of the coating solution composition and the coating conditions employed in this coating operation are shown in Table 1. After the application, the Braun tube is left as it is for a given period of time, then detached from the coating device and dried with nitrogen gas. The Braun tube may be dried by any of such gas drying, cold- or hot-air drying using clean air, and furnace drying. After the drying, the Braun tube is attached to another coating device of the same specifications as the first used one, and a coating solution containing anti-reflection ultrafine particles ($SiO_2$) and a binder is applied thereon. Typical examples of the coating solution composition and the coating conditions employed in this coating operation are shown in Table 1.

TABLE 1

| | Coating solution compositions and coating conditions | |
| --- | --- | --- |
| | Antistatic solution (1st layer) | Anti-reflection solution (2nd layer) |
| Solvent (Mixed alcohol) | 98 wt % | 92 wt % |
| Binder [Si(OR)$_4$] | — | 3 wt % |
| Ultrafine particle | $TiO_2$ + $SnO_2$ 2 wt % | $SiO_2$ 5 wt % |
| Coating rate | 5.0 mm/s | 2.5 mm/s |

Then, the Braun tube is fired at 160° C. for 30 minutes in a furnace. It may be cured also by ultraviolet or infrared irradiation. By the firing (or curing), the ultrafine particles are strongly bonded to the Braun tube. The above process gives an antistatic, anti-reflection film.

FIG. 2 is a layout drawing of the coating device used in this embodiment of the invention. In FIG. 2, the device used in this embodiment is composed of a Braun tube 21, a coating solution bath 22, a coating solution 23, a solution feed valve 24, a drawing valve 25, a metering pump 26, a solution tank 27, a solution feed pressure valve 28, a leaking valve 29, etc.

In the above constitution, the Braun tube 21 is attached to the coating solution bath 22 with the surface to be coated facing the inner side of the bath. In this embodiment, the attaching surface of the coating solution bath 22 is provided with a packing or an O-ring shaped sealant to prevent leakage of the coating solution and a pressure gas during the application step. Further, in view of operability, the coating solution bath is constituted so as to be sealed by mere insertion of the Braun tube.

Then, the coating solution containing the ultrafine particles is introduced into a space formed between the coating solution bath 22 and the surface to be coated of the Braun tube. For this introduction, first the drawing valve 25 and the leaking valve 29 are closed and then the solution feed valve 24 and the solution feed pressure valve 28 are opened.

By the above procedure, the coating solution 23 filled in the solution tank 26 is pressurized to fill the space on the Braun tube surface. Then, the solution feed valve 24 and the solution feed pressure valve 28 are closed, after which the drawing valve 25 and the leaking valve 29 are opened and the metering pump 26 is started, whereby the coating solution 23 filled in the space on the Braun tube surface is returned to the solution tank 27. In this case, the lowering rate of the coating solution 23 on the Braun tube surface can be adjusted to a predetermined rate by changing the solution feed rate of the metering pump 26 properly.

Next, mixing methods for preparing the above coating solution are described below. For preparing the coating solution of ultrafine particles with a high refractive index applied as the first layer, $SnO_2$ ultrafine particles with a particle size of 6 nm and $TiO_2$ ultrafine particles with a particle size of 10 nm are added to ethanol in an amount of 2% by weight. For preparing the coating solution of ultrafine particles with a low refractive index applied as the second layer, ethyl silicate [$Si(OC_2H_5)_4$] is dissolved in ethanol and $H_2O$ for hydrolysis and $HNO_3$ as a catalyst are added thereto to form a solution, after which $SiO_2$ ultrafine particles with a particle size of 120 nm are added to the solution in an amount of 5% by weight. In this case, the pH of the solution is adjusted so as to disperse the ultrafine particles sufficiently.

The space formed between the inner surface of the vessel to which the Braun tube was attached and the Braun tube surface was filled with the coating solution of ultrafine particles with a high refractive index by the above-mentioned method, and the coating solution was applied by lowering the solution level at a rate of 5.0 mm/s. After the application, force-drying with cold air is carried out. On the resulting coat was applied the coating solution of ultrafine particles with a low refractive index in the same manner as above. The coating rate in this coating operation was 2.5 mm/s. Thereafter, the coating thus formed was fired in air at 160° C. for 30 minutes to decompose the ethyl silicate. The $SnO_2$ ultrafine particles and the $SiO_2$ ultrafine particles incorporated into the respective solutions are firmly bonded and fixed to the Braun tube surface because $SiO_2$ formed by the decomposition serves as a binder. The surface of the first layer has a good and uniform wettability because the $SnO_2$ ultrafine particles and the $TiO_2$ ultrafine particles are uniformly dispersed therein and applied. Accordingly, the $SiO_2$ ultrafine particles in the second layer are uniformly arranged, allowing formation of a consistent unevenness.

FIG. 3 is a perspective view showing schematically the result of SEM (scanning electron microscope) observation through a cut section of a glass plate made of the same material as that for Braun tube and coated with the above-mentioned film. $SiO_2$ ultrafine particles 33 with a particle size of 120 nm are arranged in a layer on an electrically conductive film 32 formed in a substantially uniform thickness as the first layer on a glass plate 31. There are the parts where no ultrafine particles are present, but any of such parts is of an area capable of accommodating only two to three of the ultrafine particles, that is, about 240 to 360 nm in length, which is sufficiently smaller than the visible light wavelength. Therefore, these parts do not affect the reflection characteristics significantly.

FIG. 4 is a characteristic graph of reflectivity of an anti-reflection film to which the aforesaid ultrafine particle film has been applied. As shown in FIG. 4, the reflectivity of the Braun tube surface having the ultrafine particle film formed thereon was measured at angle of incidence of 5° to attain a low reflectivity value of 0.03% at a wavelength of 550 nm. Thus, it was confirmed that this Braun tube has a reflectivity lower than that of conventional products.

On the other hand, FIG. 5 shows antistatic characteristics of an antistatic film to which the aforesaid ultrafine particle film has been applied. The surface resistance value of said film was measured and found to be $10^8$ $\Omega/cm^2$. As shown in FIG. 5, the antistatic characteristics indicate that said film is hardly electrostatically charged, as compared with the conventional characteristics shown for reference. In this case, a thin insulating layer of binder exists between the electrically conductive ultrafine particles. It is known that materials such as $SnO_2$ undergo transfer of electrons owing to tunnel effect. This action enables the film to exhibit an electrically conductive function.

Then, the antistatic low-reflectivity film of the present invention was rubbed with a rubber eraser (50-30 type, supplied by Lion Corp.) 50 times under a load of 1 kgf. As a result, the reflectivity was changed by only about 0.1%, namely, there was no problem in the quality of the film. In the above process for forming an antistatic and anti-reflection film, the film can be formed directly on a completed Braun tube. Moreover, the process requires only mixing of $SnO_2$ ultrafine particles or $SiO_2$ ultrafine particles with an existing $Si(OR)_4$ alcoholic solution followed by application and firing, does not use harmful chemicals such as hydrogen fluoride at all, and can give a product of constant quality at a low cost.

Although $Si(OR)_4$ wherein R is ethyl is used in the above embodiment, $Si(OR)_4$ wherein R is $C_nH_m$ (m=2n+1) may be used in the range of n=1 to 5 as described above. With an increase of n, the viscosity of the solution increases a little. Therefore, an alcohol capable of controlling the viscosity increase is chosen as a solvent in view of operability.

As described above, according to this embodiment, an image display plate having a film with excellent anti-reflection effect and antistatic function formed thereon can be formed with a simple apparatus by a simple coating procedure. Furthermore, the display plate according to this embodiment can be produced by a simple and safe process without harmful chemicals such as hydrogen fluoride, and hence is suitable for mass production.

Another embodiment of the present invention is explained below with reference to FIG. 6.

Figure 6:
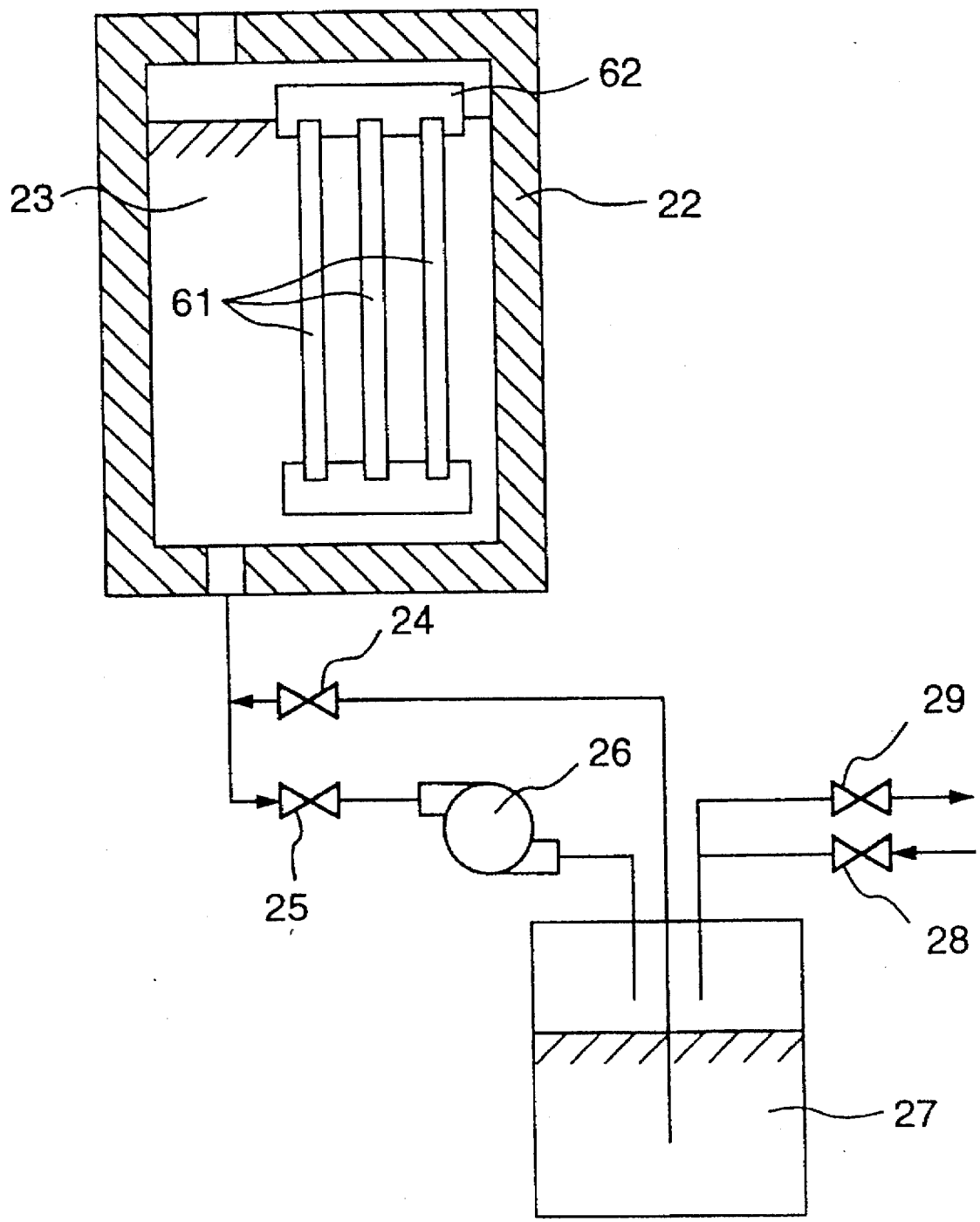
FIG. 6 is a layout drawing of a device in another embodiment of the present invention.

FIG. 6 shows the structure of an apparatus used in this embodiment. In FIG. 6, a plurality of light-transmitting substrates 61 are set on a tool 62 and placed in a coating solution bath 22. The light-transmitting substrate of the Braun tube used in the embodiment shown in FIG. 2 is a glass plate, while the light-transmitting substrate 61 used in the present emmbodiment is a plastic plate.

In this embodiment, the opening formed in the coating solution bath 22 for attachment and detachment of the tool and the object to be coated was provided with a packing or an O-ring shaped sealant to prevent leakage of the coating solution and a pressure gas during the application step. Thus, the inside of the coating solution bath 22 is kept in a hermetically sealed state.

Then, the coating solution containing the ultrafine particles was introduced into the coating solution bath 22. For this introduction, a drawing valve 25 and a leaking valve 29 were closed, and a solution feed valve 24 and a solution feed pressure valve 28 were opened. By the above procedure, a coating solution 23 filled in a solution tank 27 was pressurized to fill the coating solution bath 22.

Then, the solution feed valve 24 and the solution feed pressure valve 28 were closed, after which the drawing valve 25 and the leaking valve 29 were opened and a metering pump 26 was started, whereby the coating solution 23 filled in the coating solution bath 22 was returned to the solution tank 27. In this case, the lowering rate of the coating solution 23 on the surfaces of a plurality of the light-transmitting substrates 61 can be adjusted to a predetermined rate by changing the solution feed rate of the metering pump 26 properly. In this embodiment, the coating steps are substantially the same as illustrated in FIG. 1, but the steps of attaching the Braun tube is replaced by a step of setting the tool 62 in the coating solution bath 22, and the step of detaching the Braun tube is replaced by a step of lifting up the tool 62 from the coating solution bath 22 and setting it in another coating apparatus. For three-layer coating, the above operation is carried out by using three different types of coating solution and three sets of coating apparatus of the same specifications.

Next, mixing methods for preparing the above coating solution are described below.

For preparing the coating solution for forming an antistatic film which constitutes the first layer, $SnO_2$ ultrafine particles with a particle size of 6 nm and $TiO_2$ ultrafine particles with a particle size of 10 nm are added to ethanol in an amount of 2% by weight. For preparing the coating solution of ultrafine particles with a low refractive index applied as the second layer, ethyl silicate $[Si(OC_2H_5)_4]$ containing γ-methacryloxypropyltrimethoxysilane is dissolved in ethanol and $H_2O$ for hydrolysis and $HNO_3$ as a catalyst are added thereto to form a solution, after which $SiO_2$ ultrafine particles with a particle size of 40 nm are added to the solution in an amount of 5% by weight. In this case, the pH of the solution is adjusted so as to disperse the ultrafine particles sufficiently. Table 2 shows the coating conditions employed in the above coating operations.

TABLE 2

| | Coating solution compositions and coating conditions | |
| --- | --- | --- |
| | Antistatic solution (1st layer) | Anti-reflection solution (2nd layer) |
| Solvent (Mixed alcohol) | 98 wt % | 92 wt % |
| Binder [Si(OR)$_4$] | — | Methacryloxypropyl-trimethoxysilane |
| Ultrafine particle | TiO$_2$ + SnO$_2$ 2 wt % | SiO$_2$ 5 wt % |
| Coating rate | 5.0 mm/s | 2.5 mm/s |

Figure 7:
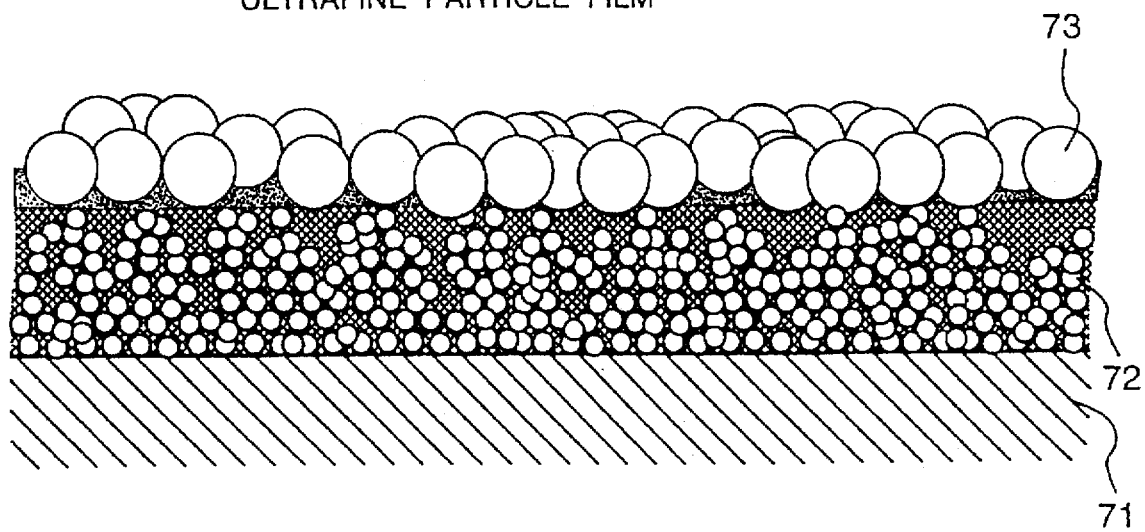
FIG. 7 is a schematic cross-sectional view of an ultrafine particle film in another embodiment of the present invention.

FIG. 7 is a schematic cross-sectional view of an ultrafine particle film in the embodiment of the present invention. After completion of the two sequential runs of coating operation, the coating was fired at 50° to 120° C. depending on the type of the plastic material used. FIG. 7 is a schematic sectional view showing the result of SEM observation through a cut section of a substrate coated with the above-mentioned film. On the surface of the substrate 71, a layer 72 of the ultrafine particles with a high refractive index is formed as the first layer so that the ultrafine particle density may be high on the substrate 71 side and low on the side reverse to the substrate 71, and a layer 73 of the ultrafine particles with a low refractive index and a diameter larger than that of the ultrafine particles of the layer 72 is formed in a substantially constant thickness on the layer 72. Thus, it becomes possible to obtain a film excellent in anti-reflection function, antistatic function, abrasion resistance and durability.

In the above embodiment, an ultrafine particle film having a two-layer structure was formed. It is also possible to form an ultrafine particle film having a three or more layers by additionally conducting the above-described process as many times as required.

Figure 8:
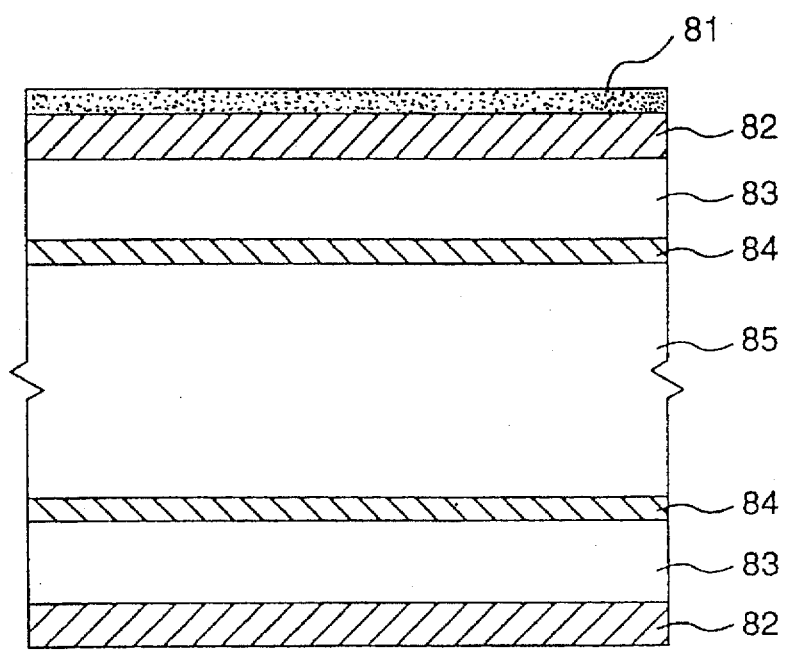
FIG. 8 is a partial diagrammatic view of a liquid crystal display device as one embodiment to which the present invention has been applied.
Figure 9:
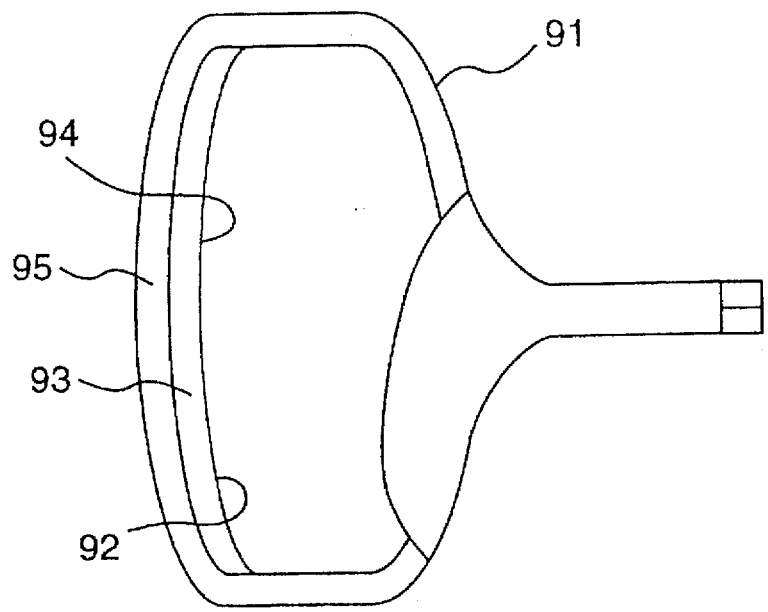
FIG. 9 is a cross-sectional view of a cathode ray tube as one embodiment to which the present invention has been applied.
Figure 10:
FIG. 10 is a diagrammatic illustration of the anti-reflection principle of the present invention.
Figure 11:
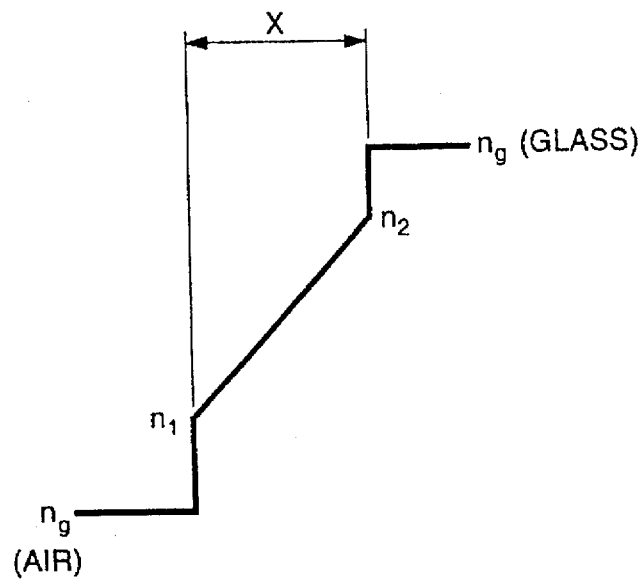
FIG. 11 is a schematic illustration of the anti-reflection principle of the present invention.
Figure 12:
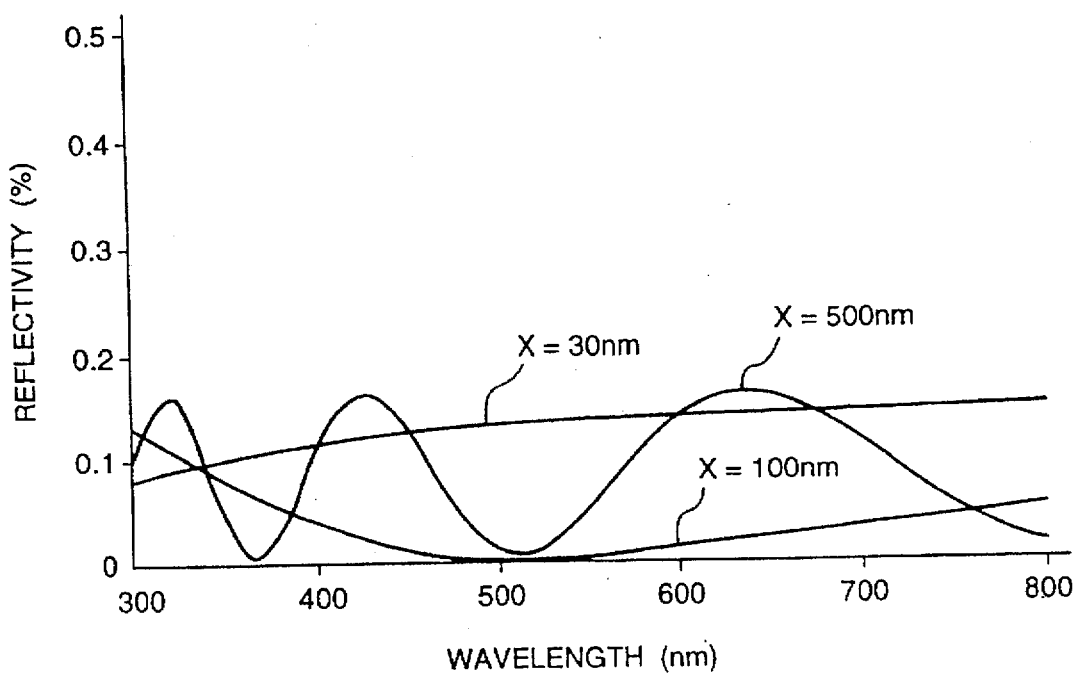
FIG. 12 shows reflection characteristics illustrating the anti-reflection principle of the present invention.
Figure 13:
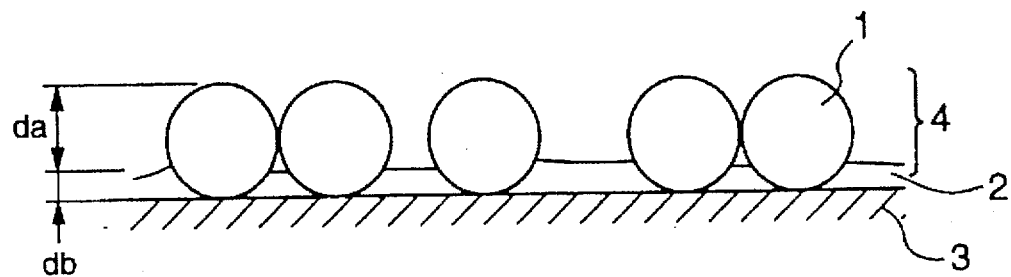
FIG. 13 is an illustration of a reflection characteristics model of one embodiment to which the present invention has been applied.
Figure 14:
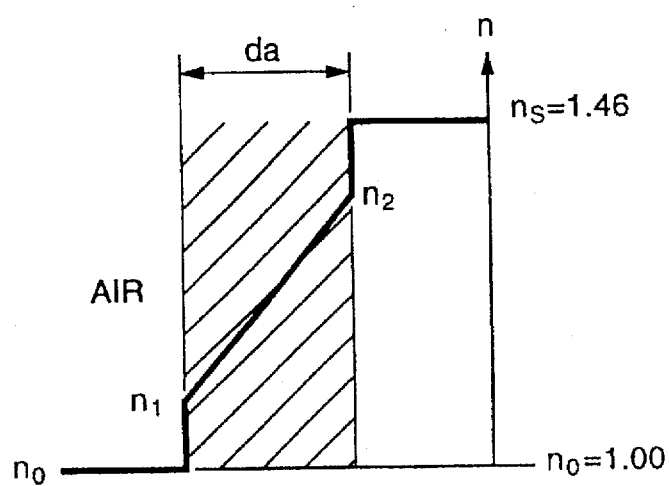
FIG. 14 is an illustration of another reflection characteristics model of one embodiment to which the present invention has been applied.

FIG. 8 shows a part of an ultrafine particle film of the present invention used in a liquid crystal display device (TFT). In this embodiment, a common electrode 84, a glass substrate 83 and a deflector 82 are laminated on each side of a liquid crystal 85. The ultrafine particle film of the present invention is on the surface of the deflector 82.

The surface of a liquid crystal display plate has heretofore been provided with, for example, unevenness of the order of micron to diffuse the reflection from the surface. Such a treatment prevents image formation by reflected light but is disadvantageous in that owing to diffuse reflection, an original picture image becomes dim, resulting in a lowered resolution. This disadvantage has been a cause of the eyes fatigue of operators. By contrast, in the present embodiment, the reflection is almost prevented as described above, so that such a problem is not caused. Conventional methods permit perception of only 65 to 70 lines/cm by human eyes, while the present embodiment permit perception of 85 lines/cm or more which is considered the resolution limit of human eyes, because it is free from the above problem.

As described above, a light-transmitting plate composed of a substrate and the ultrafine particle film of the present invention formed thereon can easily be applied to a liquid crystal panel, window glass for automobiles, or protective plate for exhibited articles, and it is also possible to produce an image display plate or an image display protection plate by forming an ultrafine particle film on a light-transmitting substrate by the above-mentioned process. Moreover, the image display plate or the image display protection plate may be applied to a Braun tube. Needless to say, the above-mentioned substrates include not only flat substrates but also substrates having a surface with a curvature.

According to the present invention, an ultrafine particle film excellent in resistance to dirt adherence can easily be formed with ultrafine particles on an object to be coated, by a simple coating method, and there can be obtained a visible light anti-reflection film, an antistatic film and/or an infrared-reflection film which can be applied to a large area at low cost, and a light-transmitting plate, image display plate, image display protection plate, Braun tube, liquid crystal panel, window glass for automobiles, protective plate for exhibited articles, etc., to which the visible light anti-reflection film, antistatic film and/or infrared-reflection film have been applied.

What is claimed is:

1. A process for forming an ultrafine particle film in which an ultrafine particle film is formed on a substrate by ultrafine particles and a binder filled in gaps between the ultrafine particles, said process comprising:

forming a first layer by application of a coating solution of ultrafine particles with a refractive index higher than that of a substrate, and forming a second layer by application of a mixed coating solution of ultrafine particles with a refractive index lower than that of the substrate and a binder.

2. A process for forming an ultrafine particle film in which two layers of ultrafine particle film are formed on a substrate by ultrafine particles and a binder filled in gaps between the ultrafine particles, said process comprising:

placing the substrate in a container for coating solution, introducing a coating solution of ultrafine particles with a refractive index higher than that of the substrate into the container, discharging the coating solution out of the container after the coating solution has overspread the portion of the substrate where ultrafine particle film is to be formed, to form a first layer, introducing a mixed coating solution of ultrafine particles with a refractive index lower than that of the substrate and the binder into the container, and discharging the mixed coating solution out of the container after the mixed coating solution has overspread the portion of the substrate where ultrafine particle film is to be formed, to form a second layer.

3. A process for forming an ultrafine particle film in which an ultrafine particle film composed of at least two layers is formed on a substrate by ultrafine particles and a binder filled in gaps between the ultrafine particles, said process comprising forming at least two of the layers which constitute the ultrafine particle film, as follows: a first layer is formed so that the ultrafine particle density may be high on the substrate side and low on the side reverse to the substrate, and then a second layer on the first layer is formed using ultrafine particles with a diameter larger than that of the ultrafine particles which constitute the first layer.

4. A process for forming an ultrafine particle film according to claim 3, wherein the ultrafine particle film formed on the substrate is composed of two layers.

5. A process for forming an ultrafine particle film according to any one of claims 3 and 4, wherein the second layer is a surface layer composed of a single-layer film.

6. A process for forming an ultrafine particle film according to any one of claims 1, 2, 3 and 4, wherein the ultrafine particles used in the first layer among the layers formed on the substrate to constitute the ultrafine particle film are selected from the group consisting of $SnO_2$ (tin dioxide), $SnO_2$ and $Sb_2O_3$ (antimony oxide), $In_2O_3$ (indium oxide), $In_2O_3$ and $SnO_2$, $TiO_2$ (titanium oxide), $TiO_2$ and $SnO_2$, and $ZrO_2$ (zirconium oxide).

7. A process for forming an ultrafine particle film according to any one of claims 1, 2, 3 and 4, wherein the ultrafine particles used in the second layer among the layers formed on the substrate to constitute the ultrafine particle film are selected from the group consisting of $SiO_2$ (silicon dioxide) and $MgF_2$ (magnesium fluoride).

8. A process for forming an ultrafine particle film according to any one of claims 1, 2, 3 and 4, wherein the binder is $Si(OR)_4$, wherein R is alkyl, and the substrate is pretreated with an alkali or an acid.

9. A process for forming an ultrafine particle film according to any one of claims 1, 2, 3 and 4, wherein an ultrafine particle film composed of the first layer and the second layer is formed on each side of the substrate.

10. A process for forming an ultrafine particle film according to any one of claims 1, 2, 3 and 4, wherein an ultrafine particle film composed of the first layer and the second layer is formed on only one side of the substrate.

11. A process for forming an ultrafine particle film according to any one of claims 1, 2, 3 and 4, wherein the ultrafine particles used for forming the first layer are those of a compound of tin oxide and titanium oxide which have a particle size of 10 nm or less.

12. A process for forming an ultrafine particle film according to any one of claims 1, 2, 3 and 4, wherein the ultrafine particles used for forming the second layer are $SiO_2$ ultrafine particles having a particle size of 40 to 150 nm.

* * * * *